J. J. CASTELLINI.
VEGETABLE WASHER.
APPLICATION FILED JAN. 26, 1918.
1,311,496.
Patented July 29, 1919.
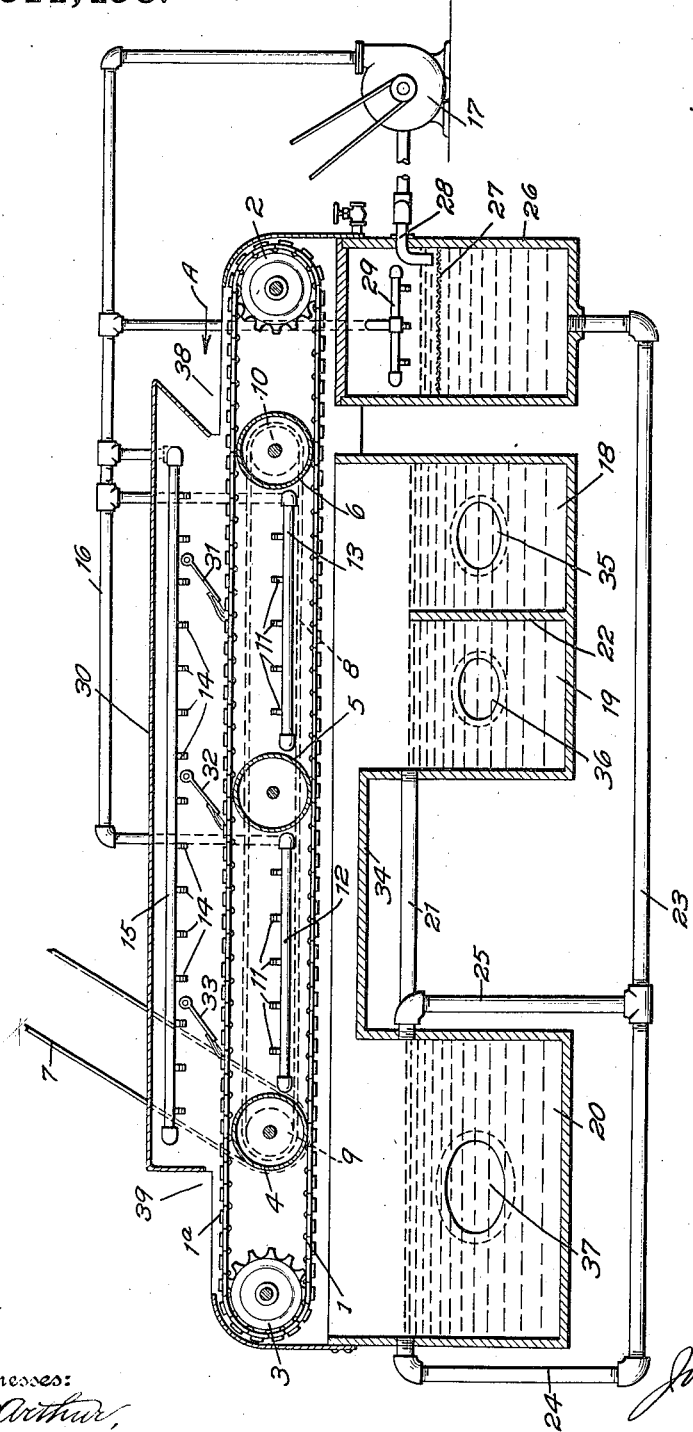
Witnesses:
Inventor
Joseph J. Castellini
By
Walter T. Murray Attorney

UNITED STATES PATENT OFFICE.

JOSEPH J. CASTELLINI, OF CINCINNATI, OHIO.

VEGETABLE-WASHER.

1,311,496.

Specification of Letters Patent. Patented July 29, 1919.

Application filed January 26, 1918. Serial No. 214,003.

*To all whom it may concern:*

Be it known that I, JOSEPH J. CASTELLINI, a citizen of the United States of America, and resident of Cincinnati, in the county of Hamilton and State of Ohio, have invented a new and useful Improvement in Vegetable-Washers, of which the following is a specification.

An object of my invention is to produce a vegetable washer adapted to remove dirt from celery, potatoes, turnips and other vegetables, to utilize the same cleaning water in the continuous operation of the machine, and to remove the dirt from the water before it is again utilized in the cleaning operation.

This and other objects are attained in the machine described in the following specification and illustrated in the accompanying drawing which illustrates a longitudinal sectional elevation in somewhat diagrammatic manner, of the machine embodying my invention.

My improved machine comprises a linked conveyer 1 passing over sprockets 2 and 3 at the ends of the machine and supported at points between the sprockets by rollers 4, 5 and 6. The conveyer is operated by any suitable means such as a belt 7 which drives roller 4 and a belt 8 which passes over pulleys 9 and 10 and drives roller 6 from roller 4. Beneath upper branch 1ª of conveyer 1 are spray nozzles 11 mounted upon pipes 12 and 13 and adapted to project sprays of water upwardly, and above upper branch 1ª of conveyer 1 are a series of spray nozzles 14 mounted upon pipe 15 and adapted to project sprays of water downwardly. Pipes 12, 13 and 15 are connected to a supply pipe 16 extending from a pump 17. For the purpose of catching the dirty water falling from the vegetables on conveyer 1, I have provided a series of tanks 18, 19 and 20. Tank 18 catches the dirtiest water, tank 19 catches the next dirtiest water and tank 20 catches the least dirty water falling from the vegetables as well as catching the overflow from tanks 19 and 18. A pipe 21 is provided for conducting the overflow of tank 19 to tank 20 and the overflow from tank 18 to tank 19 is over partition 22 which separates tanks 18 and 19. From tank 20 the water is conducted through a pipe 23, branches 24 and 25 of which communicate with tank 20 at the water level. Pipe 23 leads into a tank 26 from which the water is drawn into pump 17. To avoid drawing any sediment into pump 17 I have provided a screen 27 adjacent to feed pipe 28 of pump 17 and above screen 27 I have located a series of spray nozzles 29 which keep the screen free from the accumulation of sediment. This set of spray nozzles is connected with pipe 16. Over conveyer 1 and spray nozzles 14 and 11 is located a casing 30 in the sides of which are pivoted a series of brushes 31, 32 and 33 which bear upon conveyer 1 and which turn the vegetables over as they pass beneath them. A drain board 34 is provided between tanks 19 and 20. Man holes 35, 36 and 37 are provided in the respective tanks 18, 19 and 20 for purposes of cleaning.

In the operation of my improved machine the vegetables are laid on the conveyer at the point 38 as the conveyer is in movement in the direction of arrow A. Simultaneously the operation of pump 17 causes sprays of water to issue from nozzles 11 and 14, thus removing the loose dirt from the vegetables. In addition to this the brushes 31, 32 and 33 operate to turn the vegetables over as they pass beneath them so as to present the unsprayed surfaces to the sprays of water. The vegetables are removed at point 39 after they have passed through the machine.

The dirty water falls into the tanks located beneath the conveyer, the dirtiest water falling into the first tank 18, the next dirtiest into the next tank 19 and the least dirty into tank 20. The dirt in tank 18 may settle partially before the water overflows partition 22 and the dirt in tank 19 may settle partially before the water flows through pipe 21 into tank 20. In tank 20 the most of the remainder of the dirt may settle before the water finally passes through pipes 24, 25 and 23 and into tank 26 from which it is removed by pump 17 for again spraying it through nozzles 11 and 14. Nozzles 29 are connected with pipe 16 and operate to spray agitating streams of water upon screen 27 to keep the screen free from accumulated dirt upon its under side. When sufficient dirt has accumulated in the tanks, manholes 35, 36 and 37 may be opened to clean the tanks, and the cover of tank 26 and its screen 27 may be removed for cleaning purposes.

Having thus described my invention, what I claim is;

In a vegetable washer the combination of a conveyer adapted to receive at one end vegetables to be washed and at the opposite end to discharge the cleaned vegetables, sprayers adjacent to and adapted to project water upon the conveyer, a tank located beneath the conveyer at its receiving end, a tank located beneath the conveyer near its discharging end and a tank located beneath the conveyer intermediate said tanks, said tanks being adapted to receive water falling from the vegetables, means for causing the water from the first tank to overflow into the intermediate tank and from the intermediate tank into the last tank, a pipe connecting the last tank of the series with the sprayers and a pump for conveying water from the last tank to the sprayers.

In testimony whereof, I have hereunto subscribed my name this 22nd day of January, 1918.

JOSEPH J. CASTELLINI.

Witnesses:
 WALTER F. MURRAY,
 W. THORNTON BOGERT.